(12) United States Patent
Brusberg et al.

(10) Patent No.: US 9,983,360 B2
(45) Date of Patent: May 29, 2018

(54) PLUG-IN FIBER COUPLING UNIT, FIBER COUPLING SYSTEM AND METHOD FOR COUPLING OPTICAL FIBERS TO INTEGRATED OPTICAL WAVEGUIDES

(71) Applicant: FRAUNHOFER-GESELLSCHAFT ZUR FOERDERUNG DER ANGEWANDTEN FORSCHUNG E.V., Munich (DE)

(72) Inventors: Lars Brusberg, Berlin (DE); Henning Schroeder, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days. days.

(21) Appl. No.: 15/370,695

(22) Filed: Dec. 6, 2016

(65) Prior Publication Data

US 2017/0160479 A1    Jun. 8, 2017

(30) Foreign Application Priority Data

Dec. 7, 2015   (DE) .................. 10 2015 224 397

(51) Int. Cl.
*G02B 6/26* (2006.01)
*G02B 6/30* (2006.01)
(Continued)

(52) U.S. Cl.
CPC .............. *G02B 6/30* (2013.01); *G02B 6/122* (2013.01); *G02B 6/136* (2013.01); *G02B 6/3881* (2013.01)

(58) Field of Classification Search
USPC ................................... 385/50, 129
See application file for complete search history.

(56) References Cited

U.S. PATENT DOCUMENTS 5,371,818 A    12/1994  Presby
5,732,173 A     3/1998  Bylander et al.
(Continued)

FOREIGN PATENT DOCUMENTS

DE        692 19 843 T2    1/1998
WO          03/029852 A3    4/2003
WO        2015/098854 A1    7/2015

OTHER PUBLICATIONS

Pitwon, R. Ca. et al., Pluggable Electro-Optical Circuit Board Interconnect Based on Embedded Graded-Index lanar Glass Waveguides, Journal of Lightwave Technology, 2015, vol. 33, No. 4, pp. 741-754.

*Primary Examiner* — Eric Wong
(74) *Attorney, Agent, or Firm* — FisherBroyles, LLP; Robert Kinberg

(57) ABSTRACT

The present invention relates to a method, as well as a fiber coupling unit, for coupling optical fibers to optical waveguides that are integrated into a substrate. The coupling unit features a contact surface for contacting the surface of the substrate with the integrated waveguides, as well as trench structures for accommodating optical fibers. The end faces of inserted fibers and/or a raised structure on the edge of the contact surface form a coupling or stopping face for the end face of the substrate with the integrated waveguides. At least one opening is produced in the contact surface and designed for accommodating a mechanical connecting element in a form-fitting fashion or guiding a mechanical connecting element parallel to the contact surface and perpendicular to the coupling or stopping face in a form-fitting fashion. Alternatively, the contact surface may also be rigidly connected to a connecting element protruding from the contact surface. The proposed method and the proposed fiber coupling unit, the coupling substrate of which consists of a glass or polymer material, make it possible to cost-effectively (Continued)

realize the coupling of optical glass fibers to integrated waveguides with minimal effort.

11 Claims, 2 Drawing Sheets

(51) Int. Cl.
*G02B 6/38* (2006.01)
*G02B 6/122* (2006.01)
*G02B 6/136* (2006.01)

(56) References Cited

U.S. PATENT DOCUMENTS

| | | | | |
|---|---|---|---|---|
| 5,974,214 | A * | 10/1999 | Shacklette | G02B 6/1221 385/114 |
| 7,292,756 | B2 * | 11/2007 | Moynihan | G02B 6/1221 385/139 |
| 2016/0306120 | A1 | 10/2016 | Matsumoto | |

* cited by examiner

PLUG-IN FIBER COUPLING UNIT, FIBER COUPLING SYSTEM AND METHOD FOR COUPLING OPTICAL FIBERS TO INTEGRATED OPTICAL WAVEGUIDES

CROSS-REFERENCE TO RELATED APPLICATION

This application claims priority to Application No. 10 2015 224 397.4 filed in Germany on Dec. 7, 2015, the disclosure of which is incorporated herein by reference in its entirety.

BACKGROUND OF THE INVENTION

Technical Field

The present invention relates to a fiber coupling unit, to a method for coupling optical fibers to optical waveguides that are integrated into a substrate and extend up to an end face of the substrate, as well as to a fiber coupling system consisting of the fiber coupling unit and the substrate with the integrated waveguides.

Optical glass substrates with planar integrated waveguides require a plurality of optical interfaces for incoupling and outcoupling the optical signals. For this purpose, the integrated waveguides frequently have to be coupled to optical fibers, by means of which the optical signals are transported to and from the optical glass substrate. The coupling of the optical fibers requires a very precise adjustment of the fibers relative to the integrated waveguides. On the other hand, it should also be possible to cost-effectively produce this coupling with minimal effort.

Prior Art

In order to couple optical fibers to integrated optical waveguides in optical glass or polymer substrates that may form, e.g., part of electro-optical circuit boards, it is known to install optical sockets on the edge of the substrate or the circuit board. For this purpose, 3D structures in the circuit board are used as mechanical stops for the installation of the sockets. When polymer waveguides are used, milling and lithography processes can be used for producing the structures in the circuit board. In this case, markings on the circuit board and the socket are also used for aligning these components relative to one another by means of a visual adjustment. However, the considerable tolerances in the manufacture of circuit boards have thus far precluded an industrial application of this technology.

Another option for coupling optical fibers to integrated optical waveguides is described in DE 692 19 843 T2. In this case, a fiber coupling unit consisting of a silicon substrate is used, in which trench structures for accommodating optical fibers are produced by means of conventional silicon etching techniques. The silicon substrate features a contact surface for contacting the surface of the substrate with the integrated waveguides. The trench structures extend up to this contact surface, wherein the end faces of the optical fibers inserted into the trench structures form a stopping face for the end face of the substrate with the integrated waveguides. Two openings with a defined geometry are produced in the contact surface of the silicon substrate, wherein connecting elements formed on the substrate with the integrated waveguides engage into said openings when this substrate is coupled to the silicon substrate. The silicon substrate is exactly positioned relative to the substrate with the integrated waveguides in all three directions in space due to the combination of the contact surface, the stopping face and the engagement of the connecting elements into the openings. In this way, an elaborate active adjustment of the two substrates can be eliminated. However, the use of a silicon substrate with structures that are very exactly produced by means of conventional silicon etching technologies (for example, anisotropic etching, wet-chemical etching or ion beam etching) is associated with relatively high costs.

SUMMARY OF THE INVENTION

The present invention is based on the objective of disclosing a method and a fiber coupling unit for coupling optical fibers to optical waveguides integrated into a substrate, wherein said method and fiber coupling unit only require a minor adjusting effort during the coupling process and can be inexpensively realized due to the elimination of silicon technology (monocrystalline substrates, clean room technology).

The proposed fiber coupling unit is formed of a substrate that is referred to as coupling substrate in the present patent application and consists of a glass or polymer material. The coupling substrate features a contact surface for contacting a surface of the substrate with the integrated waveguides, as well as trench structures for accommodating optical fibers. These trench structures extend—in a top view of the contact surface—at least up to the contact surface. The end faces of optical fibers inserted into the trench structures and/or a raised structure of the coupling substrate on the edge of the contact surface form a coupling or stopping face and define the position of the end face of the substrate with the integrated waveguides on the coupling substrate in one of the potential embodiments of the fiber coupling unit. The fibers may mechanically abut on the waveguides in the substrate or form a gap, which can be filled with a material that is adapted with respect to the refractive index. The contact surface of the coupling substrate features at least one opening, in which a mechanical connecting element can be accommodated in a form-fitting fashion or guided along an axis extending parallel to the contact surface and perpendicular to the coupling or stopping face in a form-fitting fashion. In an alternative embodiment, the contact surface of the coupling substrate features at least one connecting element that protrudes from the contact surface and engages into a corresponding opening in the surface of the substrate with the integrated waveguides when the coupling substrate is coupled to this substrate.

The fiber coupling unit allows a purely passive mechanical adjustment during the coupling of optical fibers to the substrate with the integrated waveguides. In the proposed method, the contact surface of the coupling unit is directly placed on the surface of the substrate, into which the preferably planar waveguides are integrated. In this way, the passive mechanical adjustment is realized in the first direction in space, which is also referred to as z-direction below. The adjustment in the second direction in space, which is referred to as x-direction below, is in one variation realized due to the contact of the stopping face of the fiber coupling unit with the end face of the substrate. The adjustment in the remaining third direction in space, which is referred to as y-direction below, is realized by means of the at least one opening in the contact surface in conjunction with a mechanical connecting element that is inserted into the opening and also referred to as plug-in element below, as well as a corresponding opening in the surface of the substrate with the integrated waveguides. In a second variation, these openings may in conjunction with the plug-in element simultaneously serve for the adjustment in the x-direction instead of the stopping face. In the alternative embodiment, the mechanical connecting element or plug-in element is formed directly, i.e. without corresponding opening, on the contact surface of the coupling substrate and connected thereto. However, the plug-in element may also be formed on the surface of the substrate with the integrated waveguides. Consequently, this fiber coupling unit allows a purely passive mechanical adjustment of the optical fibers, e.g. glass or polymer fibers, inserted therein relative to the optical waveguides integrated into the substrate. The substrate may consist, e.g., of a glass substrate. It may be realized in the form of an electro-optical circuit board or a component of such a circuit board. Due to this purely passive mechanical adjustment, optical fibers can be quickly and inexpensively coupled to integrated waveguides. The proposed fiber coupling unit can also be very cost-effectively produced because glass or polymer materials are used rather than a silicon substrate. In this context, it was recognized that the available technologies for the processing of glass or polymer materials also make it possible to achieve a sufficiently high accuracy for the fiber coupling without having to utilize silicon technology for the precise production of structures.

The proposed fiber coupling unit makes it possible to cost-effectively package a substrate with integrated waveguides with standard plug-type optical fiber interfaces or open-beam interfaces. If glass is used as the material for the coupling substrate in accordance with the invention, a high mechanical reliability can be easily and cost-effectively achieved with a corresponding thickness of the coupling substrate. In this case, the fiber coupling unit may be fixed on the substrate with the optical waveguides separably, e.g., by means of clamping or inseparably, e.g., by applying adhesive to at least one of the contact points or by means of welding or soldering.

The trench structures are produced in the coupling element such that the optical axes of the inserted optical fibers correspond to the optical axes of the waveguides in the coupling position, which is defined by the contact surface and the plug-in connection and in one embodiment also by the stopping face, after the contact surface of the fiber coupling unit has been placed on the surface of the substrate. To this end, the trenches for the optical fibers must be arranged and dimensioned accordingly.

In an embodiment of the proposed fiber coupling unit, the one or several optical fibers are permanently connected to the fiber coupling unit. In this case, corresponding connectors, sockets or other connecting elements to optical fibers, particularly standardized connectors or sockets, are preferably provided on the ends of these one or several fibers, which protrude from the fiber coupling unit.

In another embodiment, the optical fibers do not form part of the fiber coupling unit. In this embodiment, the fiber coupling unit is equipped with a fiber coupling socket on an end of the substrate that lies opposite of the contact surface, wherein the optical fibers can be inserted into this fiber coupling socket and pushed into the trench structures up to the contact surface of the coupling substrate, as well as fixed in this position.

In another embodiment of the proposed fiber coupling unit, at least one opening is provided in the contact surface of the coupling substrate and a plug-type connecting element, e.g., in the form of a locating pin can be inserted into this at least one opening in a form-fitting fashion. In this case, the substrate with the integrated waveguides features a corresponding opening, into which the connecting element or plug-in element can be inserted when the contact surface is placed on the substrate. The cross section of this opening in the substrate may likewise be realized in a form-fitting fashion referred to the connecting element. The opening may also have an oblong shape, in which case the longitudinal direction extends perpendicular to the coupling or stopping face and the width of the opening corresponds to the cross-sectional width of the connecting element. In this way, an exact passive mechanical adjustment in the y-direction can be realized. In addition, an exact passive mechanical adjustment in the x-direction can be realized if the cross section of the opening in the substrate is realized in a form-fitting fashion referred to the connecting element. The opening in the substrate is preferably realized continuously or at least so deep that the connecting element does not extend up to the base of the opening when the fiber coupling unit is placed on the substrate. Analogously, the opening in the substrate may also be designed for the form-fitting insertion of the connecting element or plug-in element and a corresponding longitudinal slot may be provided in the fiber coupling unit.

In another embodiment, the mechanical connecting element or plug-in element is directly formed on or connected to the contact surface. If the coupling substrate consists of a polymer material, this can be realized, e.g., by means of precision injection molding of a coupling substrate with the attached connecting element or plug-in element.

When glass or polymer materials are used, the openings in the substrate with the integrated waveguides and the coupling substrate can be produced with the aid of etching techniques, laser processing or micromilling. In this case, the openings are preferably produced such that their sidewalls respectively extend perpendicular to the surface of the substrate and to the contact surface of the coupling substrate. They may have an arbitrary cross section parallel to the contact surface such as, e.g., a circular or square or oblong cross section that, however, has to correspond to the cross section of the connecting element in order to achieve a form-fitting insertion.

The proposed fiber coupling unit makes it possible to effortlessly and cost-effectively couple optical fibers to integrated waveguides in optical substrates such as, e.g., in electro-optical circuit boards for data centers and high-performance computers or in modules on the basis of optical glass substrates for signal transmission or sensor technology.

BRIEF DESCRIPTION OF THE DRAWINGS

The proposed method and the corresponding fiber coupling unit are described in greater detail below with reference to exemplary embodiments illustrated in the drawings. In these drawings.

DETAILED DESCRIPTION OF THE INVENTION

Figure 1:
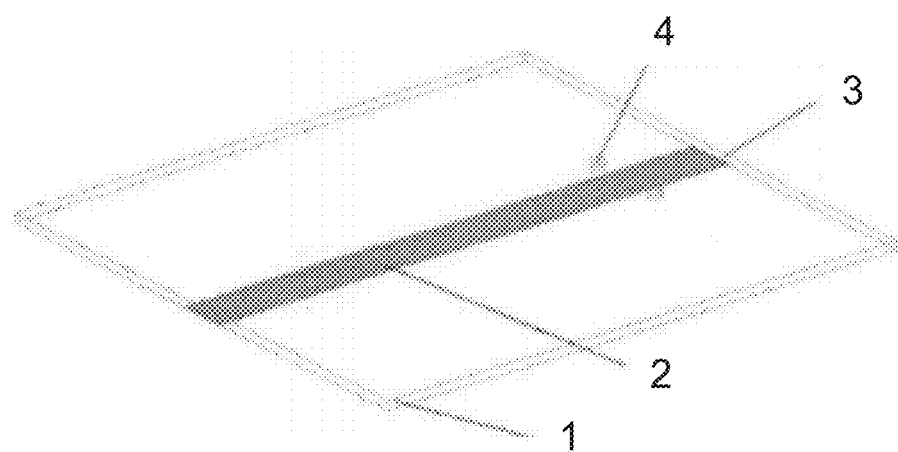
FIG. 1 shows a schematic representation of an optical glass substrate with integrated optical waveguides and openings for being connected to the proposed fiber coupling unit.

The proposed method and the proposed fiber coupling unit for coupling optical fibers to an optical glass substrate with integrated optical waveguides are described below. An example of such an optical glass substrate is illustrated in FIG. 1. This figure shows a glass substrate 1 with planar waveguides 2 integrated on the surface thereof. Optical signals can be coupled into the waveguides 2 or optical signals can be decoupled from the waveguides 2 via the end face 3 on the outer edge of the glass substrate 1. Optical fibers for relaying or delivering the optical signals should be coupled to this location. In the present example, two locating bores 4 are produced in the glass substrate 1 and extend through the entire glass substrate in order to realize the passive mechanical adjustment of the fiber coupling unit relative to the glass substrate 1. The cross section of these locating bores 4 corresponds to the cross section of mechanical connecting pins that are inserted into the locating bores 4 during the subsequent adjustment of the fiber coupling unit relative to the glass substrate 1.

Figure 2:
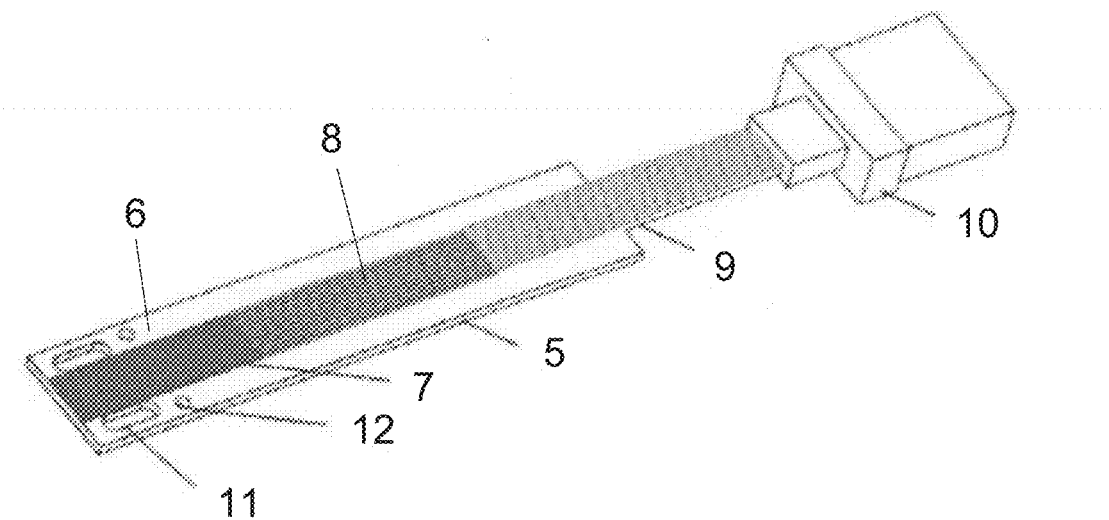
FIG. 2 shows a schematic representation of an example of a fiber coupling unit for being coupled to the optical glass substrate according to FIG. 1.

The fiber coupling unit used in this example is illustrated in FIG. 2. It is formed by the coupling substrate 5 that consists of a glass or polymer material. On one side, the coupling substrate 5 features a contact surface 6 for contacting the surface of the optical glass substrate 1. Mechanical trench structures 7 for accommodating optical fibers 8 extend from the opposite end of the coupling substrate 5 up to at least the contact surface 6 or even all the way to the other end of the coupling substrate 5 as in the example illustrated in FIG. 2. The trench structures 7 preferably have a V-shaped or U-shaped cross section. They are designed in such a way that inserted optical fibers 8 are spaced apart from one another by a distance that corresponds to the distance between the integrated waveguides 2 in the optical glass substrate 1. The trench structures 7 are furthermore dimensioned such that the optical axes of the inserted optical fibers 8 are spaced apart from the contact surface 6 by a distance that corresponds to the distance of the optical axes of the integrated waveguides 2 from the surface of the glass substrate 1.

In the present example, the optical fibers 8 are inserted into the trench structures 7 up to the edge of the contact surface 6 and fixed therein. The central section of FIG. 2 shows the stripped fibers 8 that extend up to the edge of the contact surface 6. In the rear section, these fibers are still cladded and form a flexible fiber strip 9 that ends in a MT fiber connector 10. This fiber connector allows the coupling to other glass fibers or another optical or optoelectronic unit. In the example illustrated in FIG. 2, oblong holes 11 as well as locating bores 12 for a mechanical connecting element are formed in the coupling substrate 5 in the region of the contact surface 6. Depending on the design of the glass substrate with the integrated waveguides, the adjustment is either realized by utilizing the locating bores 12 or the oblong holes 11. However, the coupling substrate 5 may in this context also feature only the oblong holes 11 or only the locating bores 12.

The fiber coupling unit is placed on the surface of the optical glass substrate 1 with its contact surface 6. In this way, the z-position of the optical axes of the optical fibers 8 relative to the optical waveguides 2 is already defined by the glass surface. The x-position of the fiber coupling unit relative to the optical glass substrate 1 is defined once the end faces of the optical fibers 8 inserted into the trench structures 7 contact the end face 3 on the outer edge of the glass substrate 1. However, this contact is not absolutely necessary in all instances. If locating bores are used, the x-position can also be defined by these locating bores. The respective locating bores 12 or oblong holes 11 in the fiber coupling unit are arranged in a precisely aligned fashion relative to the locating bores 4 the optical glass substrate 1 such that the y-position of the optical axes of the optical fibers 8 relative to the optical waveguides can be defined by inserting a connecting element or plug-in element into these bores or holes. To this end, corresponding connecting elements or connecting pins are either inserted into the locating bores 4 of the glass substrate 1 or into the locating bores 12 of the fiber coupling unit prior to the placement of the fiber coupling unit on the glass substrate 1 and subsequently engage into the corresponding bores or oblong holes once the fiber coupling unit has been placed on the glass substrate. Vice versa, corresponding oblong holes could also be formed in the glass substrate 1. In this case, the locating bores or oblong holes, into which the connecting elements or connecting pins engage when the fiber coupling unit is placed on the glass substrate, respectively must have such a depth that the mechanical connecting elements or connecting pins do not extend up to the base of these bores or holes when the connection between the fiber coupling unit and the glass substrate is produced. It is therefore preferred that these bores or holes are produced continuously (i.e. as through-holes) in the corresponding counterpart, i.e. the glass substrate or the fiber coupling unit.

If one or several optical fibers 8 are permanently connected to the fiber coupling unit, the individual fibers or a corresponding fiber strip can be connected to the optical waveguides of the optical glass substrate in one step and thereby form the optical interface with the optical glass substrate. Standardized connectors on the ends of the individual fibers or fiber strips or on a differently designed coupling element arranged on the fiber coupling unit therefore make it possible to realize a standardized, plug-type optical interface with the optical glass substrate such that a simple installation into complete systems, as well as a characterization by measuring devices, can be achieved.

Figure 3:
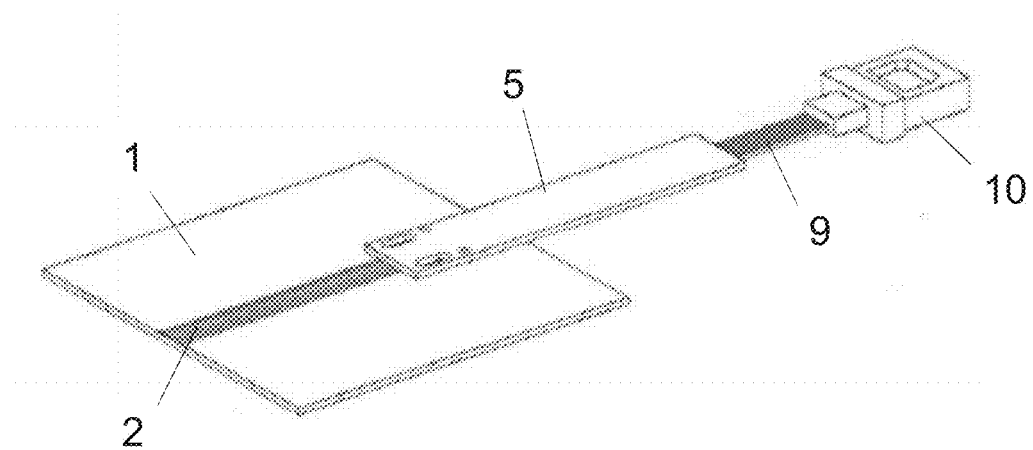
FIG. 3 shows a schematic representation of the fiber coupling unit according to FIG. 2 coupled to the optical glass substrate according to FIG. 1.
Figure 4:
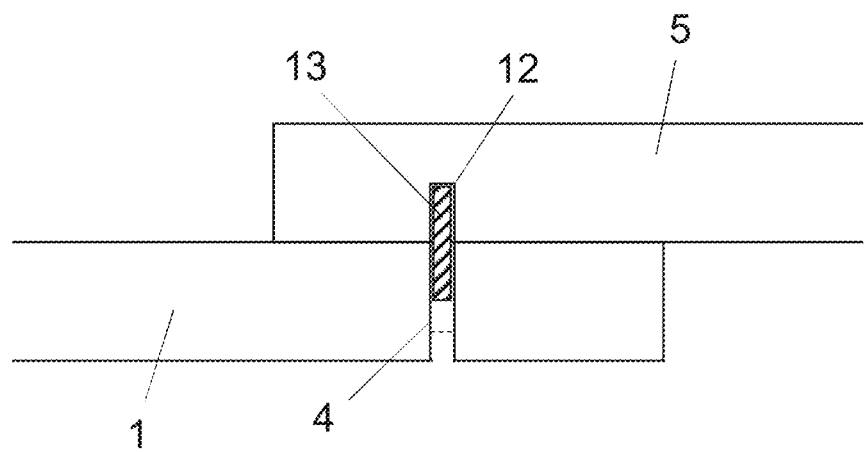
FIG. 4 shows a cross-sectional representation of an example of the connection between the proposed fiber coupling unit and an optical glass substrate produced by means of a mechanical plug-in element.

FIG. 3 once again shows the fiber coupling unit that is correspondingly connected to the optical glass substrate 1. The mechanical connecting elements in the locating bores are not visible in this figure. In this respect, FIG. 4 shows an exemplary cross-sectional representation, in which a mechanical connecting element 13 in the form of a locating pin, for example of metal or a plastic material, is inserted into the locating bore 12 of the fiber coupling unit and engages into corresponding locating bores 4 of the glass substrate in a form-fitting fashion. To this end, the locating bore 4 in the glass substrate 1 is either realized continuously or has a sufficient depth as indicated with a broken line in FIG. 4.

After—or during—the coupling of the fiber coupling unit to the glass substrate 1, possibly remaining gaps between the end face 3 of the optical glass substrate 1 and the end faces of the fibers 8 in the fiber coupling unit can be filled with a polymer that is adapted with respect to the refractive index in order to reduce Fresnel reflections.

In addition to the cylindrical connecting elements illustrated in this example, it is also possible to use any other geometries such as, e.g., cuboid elements or elements with other geometries. The corresponding mechanical connecting elements may also be integrated into the respective substrate or coupling substrate in order to keep the two substrates positioned relative to one another. It would also be possible, for example, to use an adhesive in order to permanently connect these substrates.

REFERENCE LIST

1 Optical glass substrate
2 Integrated optical waveguides

3 End face of optical glass substrate
4 Locating bores in optical glass substrate
5 Coupling substrate
6 Contact surface
7 Trench structures
8 Optical fibers
9 Flexible fiber strip
10 MTO connector
11 Oblong holes in coupling substrate
12 Locating bores in coupling substrate
13 Mechanical connecting element

What is claimed is:

1. A fiber coupling unit for coupling optical fibers to optical waveguides that are integrated into a substrate and extend up to an end face of the substrate, the coupling unit comprising:
   a coupling substrate of a glass or polymer material with
   a contact surface for contacting a surface of the substrate with the integrated waveguides and with
   one or several trench structures that extend at least up to the contact surface and serve for accommodating one or several optical fibers,
   wherein one or several end faces of one or several optical fibers inserted into the trench structures or a raised structure of the coupling substrate on an edge of the contact surface forms a coupling or stopping face for the end face of the substrate with the integrated waveguides on the coupling substrate and
   at least one opening extending through the coupling substrate in a direction perpendicular to the contact surface, the at least one opening being defined by side walls extending perpendicular to the contact surface, to accommodate a mechanical connecting element in a cross-sectionally form-fitting fashion or to guide the mechanical connecting element along an axis extending parallel to the contact surface and perpendicular to the coupling or stopping face in a cross-sectionally form-fitting fashion.

2. The fiber coupling unit according to claim 1, wherein one or several optical fibers are inserted into the trench structures and fixed in the trench structures.

3. The fiber coupling unit according to claim 2, wherein the one or several optical fibers are connected to a fiber connector or a fiber socket on an end protruding from the fiber coupling unit.

4. The fiber coupling unit according to claim 1, wherein the coupling substrate features at least two of said openings in the contact surface or at least two mechanical connecting elements protruding from the contact surface.

5. A method for coupling optical fibers to optical waveguides that are integrated into a substrate and extend up to an end face of the substrate, comprising:
   dimensioning the fiber coupling unit according to claim 1 such that optical axes of optical fibers inserted into the trench structures correspond to optical axes of the integrated waveguides when the contact surface of the coupling substrate is placed on a surface area of the substrate in a predefined coupling position,
   producing at least one opening in the surface area of the substrate that, in the coupling position, coincides with at least one of the one or several openings in the contact surface of the coupling substrate, with said at least one opening in the surface area of the substrate being designed such that the coupling position is defined at least along an axis extending parallel to the contact surface and to the coupling or stopping face by a mechanical connecting element inserted into the openings, and
   placing the fiber coupling unit on the surface area of the substrate with the contact surface of the coupling substrate arranged such that at least one mechanical connecting element inserted into the opening in the substrate or into at least one of the openings in the coupling substrate engages into the respectively corresponding opening in the coupling substrate or the substrate.

6. The method according to claim 5, wherein the producing includes producing
   the at least one opening in the substrate continuously through the substrate.

7. A fiber coupling system with a fiber coupling unit according to claim 1 and a substrate with integrated optical waveguides, wherein
   the one or several trench structures in the coupling substrate are structured such that optical axes of optical fibers inserted into the trench structures correspond to optical axes of the integrated waveguides when the contact surface of the coupling substrate is placed on a surface area of the substrate in a predefined coupling position, and wherein
   the substrate includes at least one opening that in the coupling position coincides with at least one of the one or several openings in the contact surface of the coupling substrate, with said at least one opening in the substrate being configured such that the coupling position is defined at least along an axis extending parallel to the contact surface of the coupling substrate and to the coupling or stopping face by a mechanical connecting element inserted into the openings.

8. The fiber coupling system according to claim 7, wherein
   the at least one mechanical connecting element is either fixed in the at least one opening in the substrate or in at least one of the one or several openings in the contact surface of the coupling substrate.

9. The fiber coupling system according to claim 8,
   the substrate and the coupling substrate are separably or inseparably connected to one another.

10. The fiber coupling system according to of claim 7, wherein
    the at least one opening in the substrate extends continuously through the substrate.

11. The fiber coupling system according to claim 7, wherein
    the coupling substrate includes at least two of the openings in the contact surface or at least two mechanical connecting elements protruding from the contact surface and the substrate with the integrated waveguides includes at least two of the openings that coincide with the openings in or mechanical connecting elements on the contact surface of the coupling substrate.

* * * * *